(12) United States Patent
Wiebe

(10) Patent No.: US 10,336,601 B2
(45) Date of Patent: Jul. 2, 2019

(54) REMOTE FUELING STATION WITH FUEL PUMP ENCLOSURE

(71) Applicant: Kyle Kevin Oliver Wiebe, Morden (CA)

(72) Inventor: Kyle Kevin Oliver Wiebe, Morden (CA)

(*) Notice: Subject to any disclaimer, the term of this patent is extended or adjusted under 35 U.S.C. 154(b) by 322 days.

(21) Appl. No.: 15/158,855

(22) Filed: May 19, 2016

(65) Prior Publication Data
US 2016/0362289 A1    Dec. 15, 2016

(30) Foreign Application Priority Data
Jun. 10, 2015   (CA) .................................... 2894071

(51) Int. Cl.
| B67D 7/04 | (2010.01) |
| H02S 40/38 | (2014.01) |
| B67D 7/42 | (2010.01) |
| B67D 7/84 | (2010.01) |
| H01M 10/46 | (2006.01) |
| B67D 7/78 | (2010.01) |
| B67D 7/62 | (2010.01) |

(52) U.S. Cl.
CPC ................. *B67D 7/04* (2013.01); *B67D 7/42* (2013.01); *B67D 7/78* (2013.01); *B67D 7/84* (2013.01); *H01M 10/465* (2013.01); *H02S 40/38* (2014.12); *B67D 7/62* (2013.01); *H01M 2220/10* (2013.01)

(58) Field of Classification Search
CPC ... B67D 7/04; B67D 7/42; B67D 7/62; B67D 7/78; B67D 7/84; H02S 40/38; H01M 10/465; H01M 2220/10
USPC .......................................................... 141/231
See application file for complete search history.

(56) References Cited

U.S. PATENT DOCUMENTS

| 2,317,800 A * | 4/1943 | Peter .................... B67D 7/3254 137/154 |
| 4,469,129 A * | 9/1984 | Dixon .................... B65D 90/28 137/587 |
| 5,088,530 A * | 2/1992 | Harp ...................... B65D 90/24 141/86 |
| 5,692,647 A * | 12/1997 | Brodie ...................... B60S 5/02 136/291 |

(Continued)

FOREIGN PATENT DOCUMENTS

WO    2012103498    8/2012

*Primary Examiner* — Timothy L Maust
(74) *Attorney, Agent, or Firm* — Ryan W. Dupuis; Ade & Company Inc.; Kyle R. Satterthwaite

(57) ABSTRACT

A remote fueling station for an above ground fuel storage tank has a fuel pump for dispensing a pressurize flow of fuel from the fuel tank to a dispenser nozzle. A lockable enclosure is supported on the fuel tank in fixed relation thereto by a threaded connection at an intermediate location along a rigid supply pipe connected between the fuel pump and the fuel tank. The enclosure includes a fuel pump compartment receiving the fuel pump therein and a battery compartment for receiving a battery of the fuel pump therein which is separate from the fuel pump compartment so that the battery is isolated from the fuel pump. A dispenser nozzle and an activation switch of the fuel pump can also be received within the enclosure so as to restrict access thereto by unauthorized persons. A solar panel is supported above the enclosure for recharging the battery.

7 Claims, 12 Drawing Sheets

(56) References Cited

U.S. PATENT DOCUMENTS

| | | | | |
|---|---|---|---|---|
| 5,881,760 A | * | 3/1999 | Del Zotto | B65D 88/76 137/264 |
| 8,403,071 B1 | * | 3/2013 | Webb | A62C 3/06 141/18 |
| 8,413,851 B2 | * | 4/2013 | Bruinius | B65D 90/22 137/382 |
| 2008/0128453 A1 | * | 6/2008 | Burckholter | B67D 7/34 222/75 |
| 2009/0045216 A1 | * | 2/2009 | Mamaghani | B67D 7/00 222/1 |

* cited by examiner

REMOTE FUELING STATION WITH FUEL PUMP ENCLOSURE

This application claims foreign priority benefits from Canadian Patent Application 2,894,071 filed Jun. 10, 2015.

FIELD OF THE INVENTION

The present invention relates to a remote fueling station including a fuel tank supported on the ground at a remote location and including a fuel pump for dispensing fuel from the tank to a dispenser nozzle, and more particularly the present invention relates to a fuel tank having an anti-theft enclosure supported thereon which receives the fuel pump therein and which supports a solar panel thereon for powering the fuel pump.

BACKGROUND

In many industries where work vehicles are operating in remote locations, for example agriculture, oil and gas, and/or mining, it is common to make use of a remote fueling station. A typical remote fueling stating includes a fuel storage tank, a fuel pump for pumping fuel from the storage tank to a dispenser nozzle, and a power supply for supplying power to the fuel pump. The power supply may take the form of a battery which is recharged by a solar panel, wind energy, and/or a gas powered generator. Examples of remote fueling stations using solar energy are described in U.S. Pat. No. 5,692,647 by Brodie and WO2012/103498 by Fillner Construction, Inc., but the systems described are not readily adaptable to common commercially available fuel storage tanks in a simple, low cost manner, while providing some protection against theft or vandalism.

SUMMARY OF THE INVENTION

The present invention seeks to restrict access by unauthorised persons to the fuel pump of a remote fuel storage tank in a manner which is adaptable to many different commercially available fuel storage tanks, and further seeks to provide other advantages over prior art remote fueling stations as will become apparent in the following.

According to one aspect of the invention there is provided a remote fueling station for a fuel storage tank supported above ground and having an outlet fitting, the remote fueling station comprising:

a fuel pump having an inlet for receiving fuel and an outlet for dispensing a pressurize flow of fuel therefrom;

an inlet pipe for connection from the outlet fitting of the fuel storage tank to the inlet of the fuel pump in fixed relation therebetween;

a dispenser nozzle for connection to the outlet of the fuel pump for dispensing the pressurize flow of fuel therefrom; and an enclosure for being supported about the fuel pump so as to be arranged to restrict activation of the fuel pump by unauthorized persons;

the enclosure being arranged to be supported on the fuel tank in fixed relation thereto so as to restrict removal of the enclosure from the fuel tank by unauthorized persons.

By providing an enclosure which can be supported on the fuel storage tank itself, a simple structure can be easily mounted to many varieties of tanks in a manner in which the mounts are restricted from access by unauthorized persons together with restricting access to the fuel pump and activation of the fuel pump.

Preferably the enclosure is arranged to be supported entirely on the fuel tank.

Preferably the supply pipe comprises a rigid pipe including a threaded pipe fitting therein at an intermediate location between the fuel pump and the outlet fitting of the fuel tank such that the threaded pipe fitting is supported in fixed relationship with a boundary portion of the enclosure to extend through the boundary portion of the enclosure.

According to one embodiment, the enclosure includes a bottom panel at a bottom side of the enclosure which defines the boundary portion that receives the threaded pipe fitting extending therethrough.

Alternatively, the enclosure may include an upright rear wall panel which defines the boundary portion that receives the threaded pipe fitting extending therethrough. In this instance, when the outlet fitting of the fuel tank is located in a top wall of the tank, the supply pipe may extend laterally between the outlet fitting and the enclosure which is located against an upright wall of the fuel tank. A shroud may further be provided for fully surrounding the supply pipe between the outlet fitting and the enclosure.

Preferably a supporting portion is provided on the enclosure which is adapted to engage a top side of the fuel tank.

Preferably the enclosure is formed so as to be adapted to mate non-rotatably with the tank.

In one embodiment, the enclosure comprises: i) a bottom panel defining a bottom side of a fuel pump compartment receiving the fuel pump therein; ii) a pair of support legs extending downwardly from the bottom panel to engage a top side of the tank; and iii) a depending leg portion which protrudes downwardly from the bottom panel to a bottom free end which is positioned lower than a bottom end of the support legs to prevent relative rotation between the enclosure and the tank about the supply pipe. Preferably the depending leg portion is adjustable in height relative to the enclosure.

Alternatively, the enclosure may instead comprise: i) a rear wall portion arranged to be abutted against an upright wall of the fuel tank; and ii) a shoulder portion protruding rearward from the rear wall portion so as to be arranged to abut a top side of the fuel tank when the rear wall portion abuts the upright wall of the fuel tank.

Preferably the enclosure comprises a fuel pump compartment receiving the fuel pump therein and a battery compartment separate from the fuel pump compartment which receives therein a battery for supplying power to the fuel pump such that the battery is isolated from the fuel pump.

The remote fueling station may also include a solar panel supported externally on the enclosure for recharging the battery.

According to a second aspect of the present invention there is provided a remote fueling station for a fuel storage tank supported above ground and having an outlet fitting, the remote fueling station comprising:

a fuel pump having an inlet for receiving fuel and an outlet for dispensing a pressurize flow of fuel therefrom;

a battery for supplying power to the fuel pump;

an inlet pipe for connection from the outlet fitting of the fuel storage tank to the inlet of the fuel pump in fixed relation therebetween;

a dispenser nozzle for connection to the outlet of the fuel pump for dispensing the pressurize flow of fuel therefrom;

an enclosure comprising:

a fuel pump compartment receiving the fuel pump therein so as to be arranged to restrict access to the fuel pump by unauthorized persons; and a battery compartment separate from the fuel pump compartment which receives therein the battery therein such that the battery is isolated from the fuel pump.

By providing battery compartment which is accessible independently of the fuel pump compartment, the fuel pump and batteries can remain safely enclosed and isolated from one another to protect against explosions even when accessing the dispenser nozzle and the activation switch for dispensing fuel.

According to one embodiment, the fuel pump compartment of the enclosure further receives the dispenser nozzle therein so as to be arranged to restrict access to the dispenser nozzle by unauthorized persons.

Alternatively, the enclosure may further comprise a dispenser compartment separate from the fuel pump compartment which receives the dispenser nozzle therein. In this instance, the activation switch may be located in the dispenser compartment.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
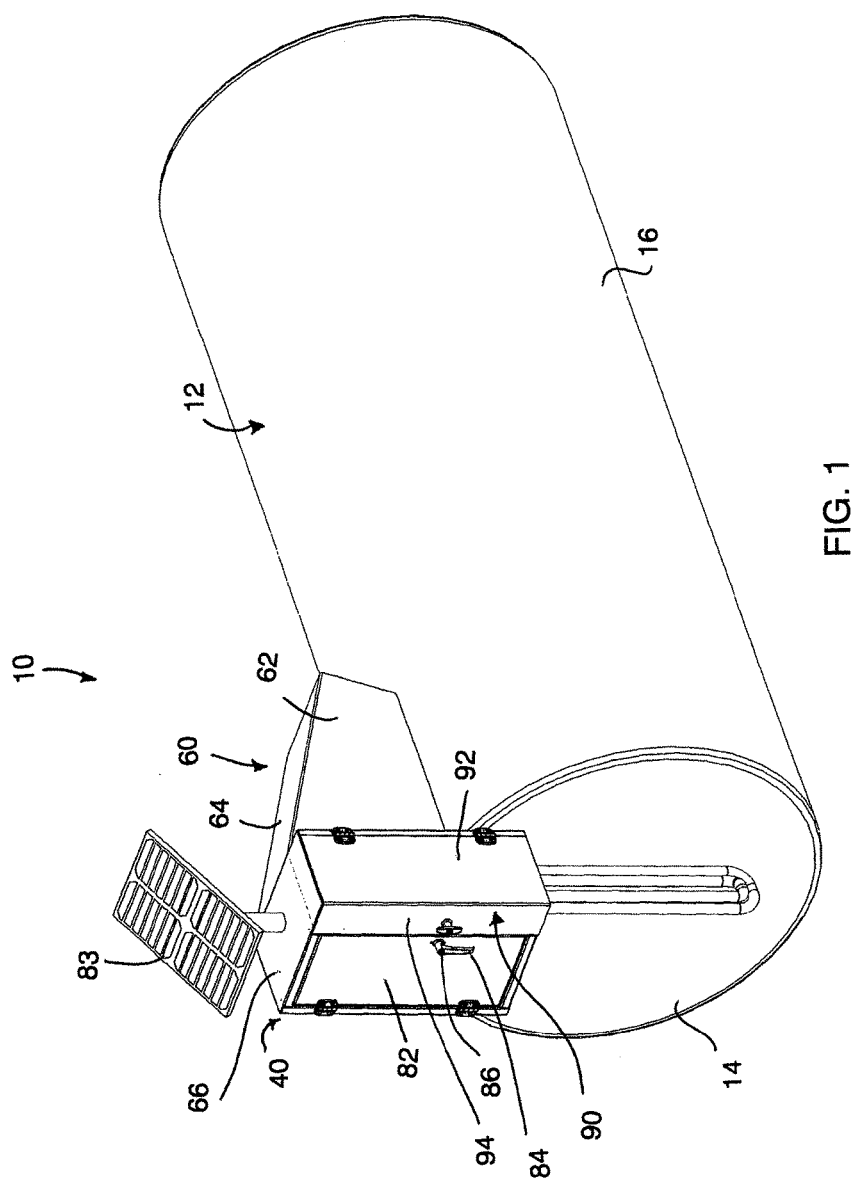
FIG. 1 is a perspective view of the remote fueling station shown supported on a fuel storage tank according to a first embodiment.

This invention relates to solar powered self-contained fueling stations. More particularly, this invention concerns the attachment to and above such a fueling station of a post-mounted solar power system, including a solar array providing shade for a shielded box holding a battery and a power control system with a power disconnect switch. Such post and solar power system may be folded down adjacent the fueling station, thus enabling easier transport of the fueling station. It also includes an area which the fueling pump and nozzle can be stored securely to eliminate any tampering that may occur when it is unsupervised. This unit is designed to be fitted on to most fuel storage tanks with modifying the size and lengths of the threaded pipe which connects the security cabinet to the fuel tank. Features of the system include: i) 1 solar panel with adjustable mount, ii) a solar charge controller with power disconnect switch, iii) a battery bank, iv) a fuel transfer pump, and v) a cabinet with multiple compartments for housing the battery bank as well as the fuel transfer pump along with the fueling nozzle.

Referring to the accompanying figures, there is illustrated various embodiments of a remote fueling station generally indicated by reference numeral 10. The station 10 is particularly suited for use with a fuel storage tank 12 of the type commonly supported above ground at a remote location for fueling vehicles and the like for example.

In both illustrated embodiments, the fuel storage tank 12 comprises a cylindrical tank which is elongate in a horizontal direction between two vertical end walls 14 joined by a cylindrical side wall 16 spanning therebetween. The cylindrical side wall 16 defines a top wall portion and a bottom wall portion of the tank. An outlet fitting 18 communicates through the top wall portion at a laterally centered location nearer to one of the end walls than the other, while remaining spaced horizontally inward from both end walls.

The fueling station 10 generally includes a fuel pump 20, a rigid supply pipe 22 communicating between the outlet fitting 18 of the tank and an inlet 24 of the fuel pump, batteries 26 for supplying electrical power to the fuel pump, an activation switch 28 for selectively disconnecting the power supply to the fuel pump, and a dispenser nozzle 30 in communication with an outlet 32 of the fuel pump.

More particularly, the fuel pump 20 is arranged to receive fuel from the fuel tank through the rigid supply pipe 22 and pressurize the flow to produce or dispense a pressurized flow of fuel at the outlet 32 as long as the fuel pump remains activated. The fuel pump automatically shuts off when the outlet pressure reaches a prescribed upper pressure limit, but will automatically start up again to re-pressurize the outlet should the outlet pressure fall below the designated pressure limit.

Figure 2:
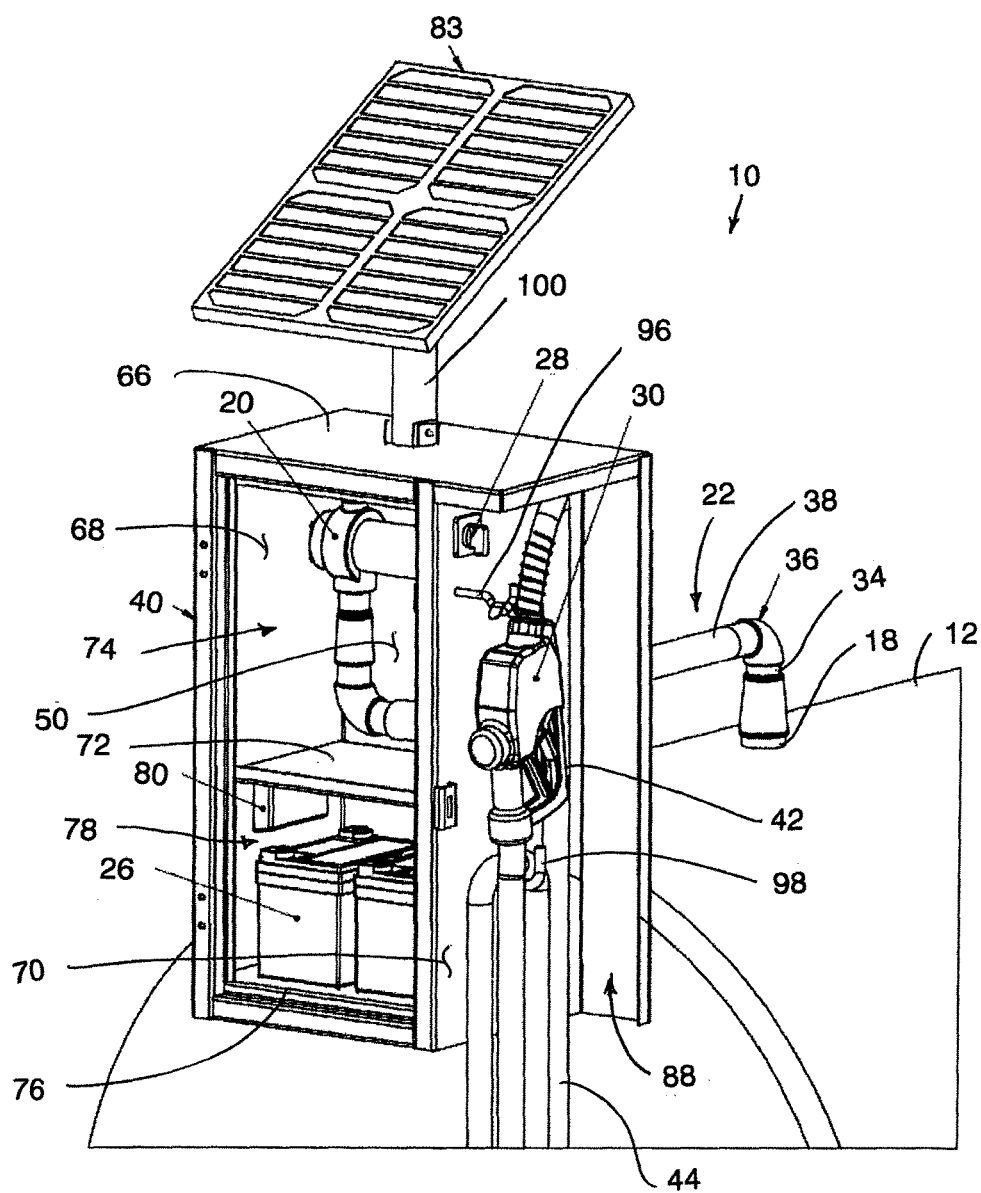
FIG. 2 is a perspective view of the remote fueling station according to the first embodiment of FIG. 1 with the door members and shroud shown removed.
Figure 3:
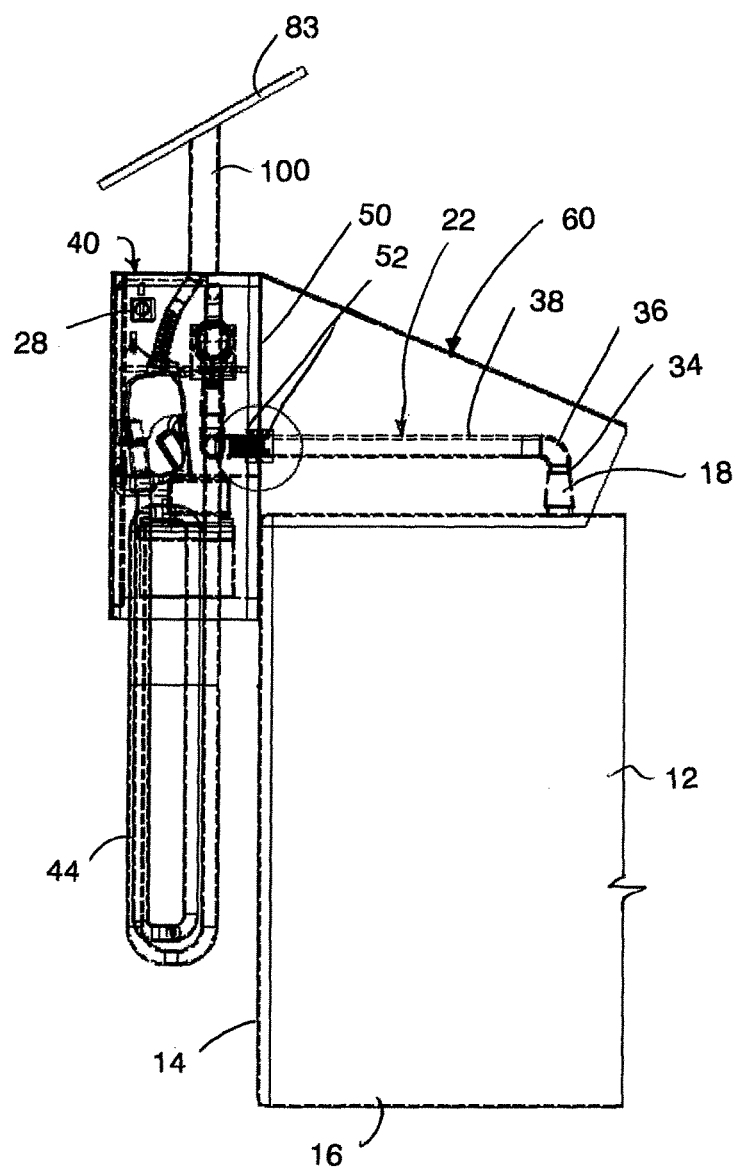
FIG. 3 is a side elevational view of the remote fueling station according to the first embodiment of FIG. 1.
Figure 4:
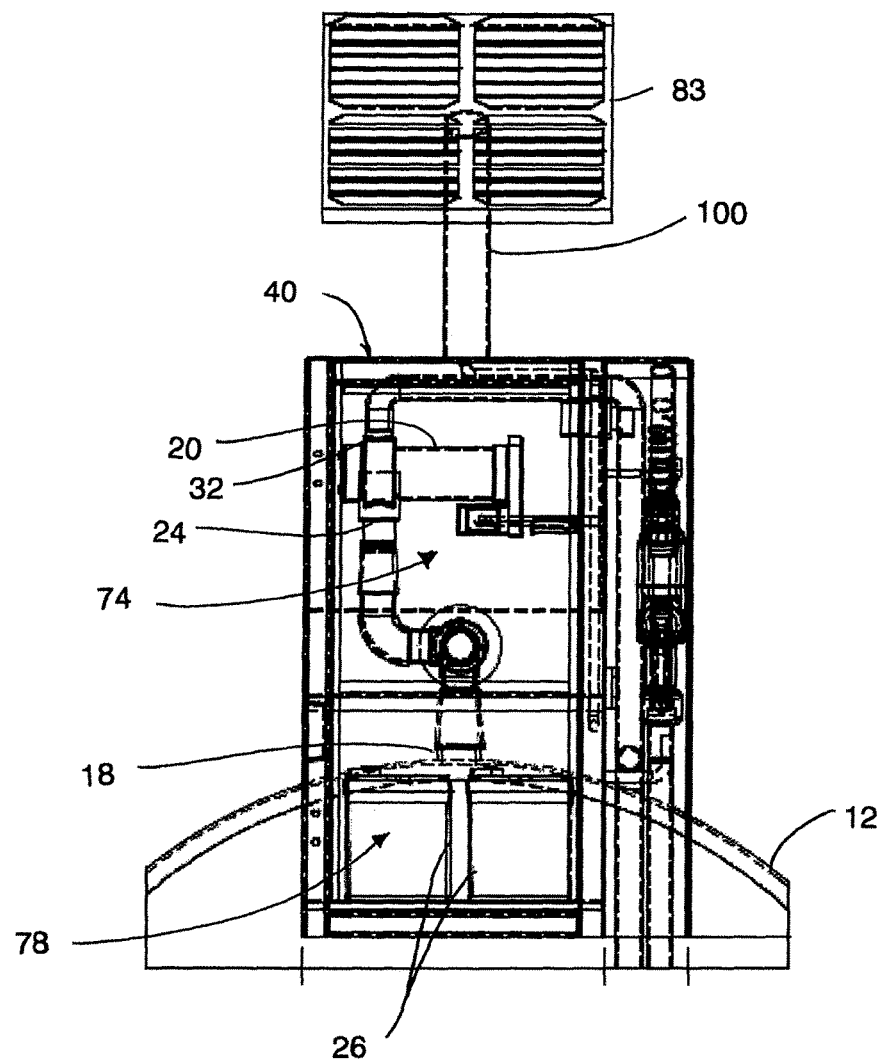
FIG. 4 is a front elevational view of the remote fueling station according to the first embodiment of FIG. 1.
Figure 5:
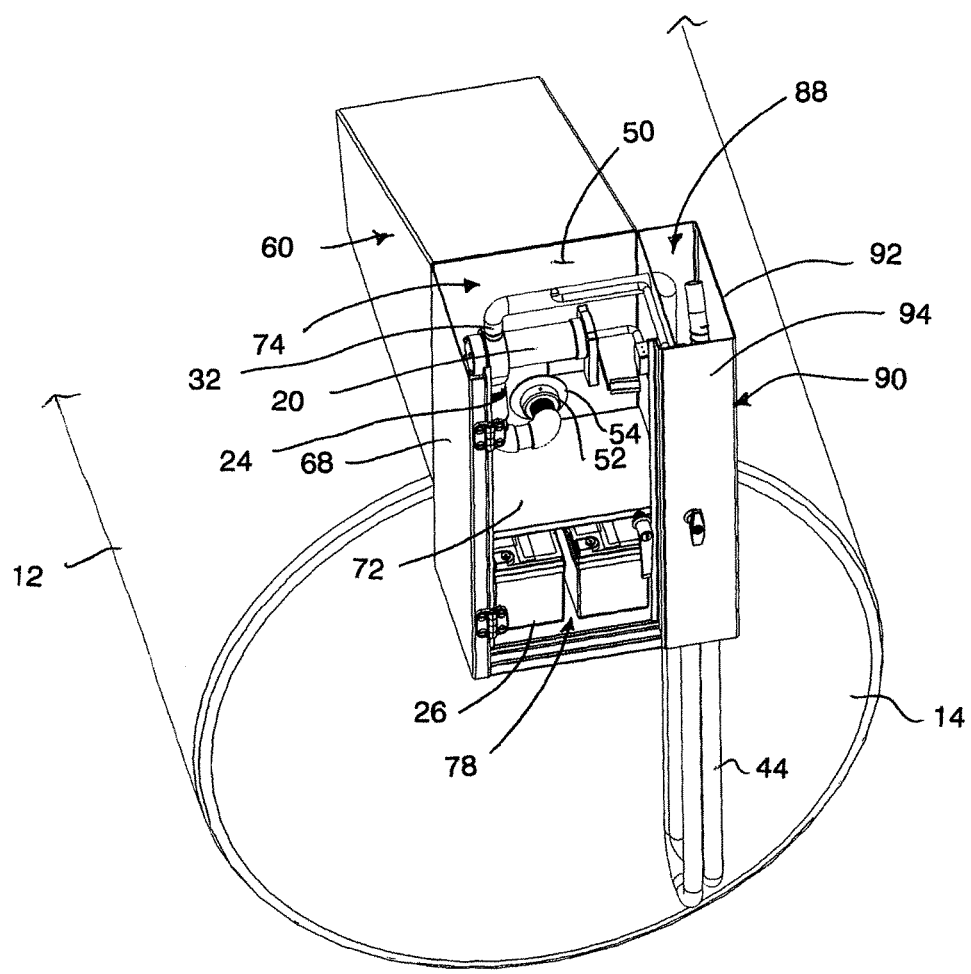
FIG. 5 is a perspective view of the remote fueling station according to the first embodiment of FIG. 1 with the first door member and the top panel shown removed.
Figure 6:
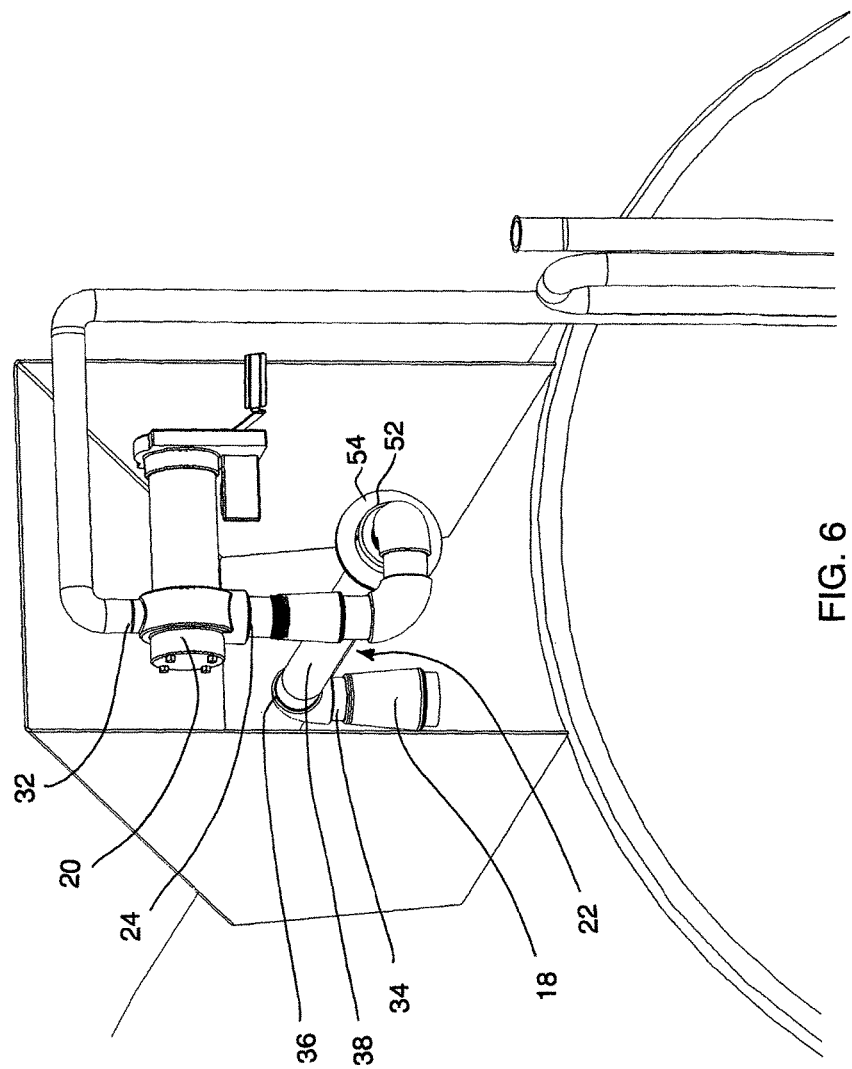
FIG. 6 is a perspective view of the rigid supply pipe connection to the fuel pump with the enclosure shown removed according to the first embodiment of FIG. 1.
Figure 7:
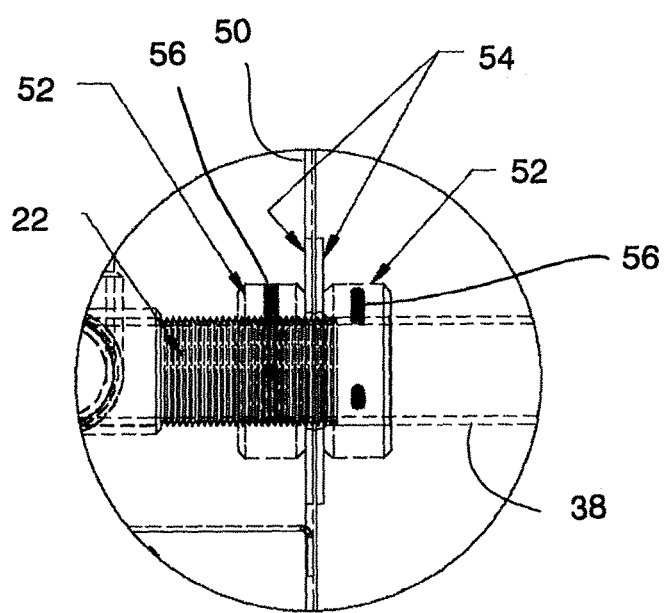
FIG. 7 is a sectional view of the connection between the rigid supply pipe and the rear wall portion of the enclosure according to the first embodiment of FIG. 1.

Turning now more particularly to the embodiment of FIGS. 1 through 7, the rigid supply pipe 22 includes a first vertical section 34 in communication with the outlet fitting 18 in the top wall of the tank. Typically an internal leg of the pipe extends down into the tank in open communication with the contents of the tank in proximity to a bottom end of the tank. A rigid elbow 36 forming a 90 degree bend connects the vertical section 34 to a horizontal section 38 which extends in the longitudinal direction of the fuel tank from the outlet fitting 18 to one of the end walls 14 of the tank where the fuel pump is located.

The fueling station 10 further comprises an enclosure 40 which is mounted at one of the end walls of the fuel storage tank as described in further detail below for enclosing various components of the fueling station to restrict access by unauthorized persons and to protect the various components.

The dispenser nozzle 30 includes a nozzle portion 42 having a valve therein which is actuated by a manual trigger for opening the valve, and a hose portion 44 which is elongate and flexible between the outlet 32 of the fuel pump and the nozzle portion 42 such that the contents of the hose portion between the outlet of the pump up to the valve of the nozzle portion remain pressurized at the upper pressure limit of the fuel pump when the fuel pump is activated. When a user opens the valve using the trigger of the nozzle portion, fuel is dispensed as a pressurized flow from the nozzle. As the outlet pressure of the fuel pump drops, the fuel pump will automatically activate when it is powered on to continue to pressurize and produce the outlet flow.

The activation switch 28 interrupts the power supply from the batteries to the fuel pump such that in an active position the fuel pump remains active to maintain the outlet flow at a prescribed outlet pressure, however, when the switch 28 is turned off, the fuel pump remains inactive to stop flow dispensed from the outlet 32 thereof.

The enclosure 40 generally includes a rear wall portion 50 comprising a vertically oriented rectangular panel having a lower portion which abuts in parallel, overlapping configuration with one of the end walls 14 of the tank in a mounted position. A pipe aperture in the rear wall portion 15 receives the horizontal section 38 of the rigid supply pipe extending therethrough for subsequent connection through a series of elbows and pipe fittings within the enclosure to the inlet of the fuel pump.

A threaded section of the rigid supply pipe extends through the pipe aperture in the rear wall portion 50 of the enclosure to permit a suitable locking collar 52 and accompanying washer 54 to be threaded onto the threaded portion of the horizontal pipe section 38 on either side of the rear wall portion 50. Each washer 54 is welded to the respective locking collar such that the two washers are in direct abutment against opposing sides of the rear wall portion which is effectively clamped therebetween by tightening the corresponding locking collars 52 on opposing sides of the rear wall portion 50 received therebetween. Each locking collar includes at least one set screw 56 threaded radially into the collar for engagement with the horizontal pipe section 38 to lock the orientation of the collars relative to one another and maintain the rear wall portion of the enclosure in rigid fixed connection with the rigid supply pipe 22 which is in turn fixed in rigid connection to the top wall portion of the fuel supply tank.

The enclosure 40 further includes a shroud portion 60 fixed to the rear wall portion 50 to protrude rearwardly therefrom at a location spaced above the bottom end of the rear wall portion. The shroud portion comprises two parallel and spaced apart side walls 62 which are vertically oriented and which project perpendicularly outwardly from the rear wall 50. The bottom edges of the two side walls 62 lie in a common horizontal plane so as to form a shoulder at the junction of the side walls to the rear wall portion 50 of the enclosure which is suitable for being engaged upon and abutting the top wall portion of the fuel storage tank 12 in the mounted position shown in the accompanying figures.

The shroud further includes a top wall 64 which is joined between the top edges of the two side walls 62 to project generally rearward and outward from the rear wall portion of the enclosure from an inner end in proximity to the top end of the rear wall portion to an outer end which is sloped downwardly relative to the inner end to be lower in elevation than the inner end. The length of the shroud portion in the longitudinal direction of the tank is greater than the distance of the outlet fitting 18 of the tank from the nearest end wall 14 such that the horizontal section 38 of the rigid supply pipe and the outlet fitting 18 to which it is connected are fully received within and surrounded by the shroud portion of the enclosure.

The enclosure 40 further includes the top wall 66 in the form of a rectangular panel extending horizontally forward from the top end of the rear wall portion 50 to the front side of the enclosure. The top wall 66 defines the upper boundary of the enclosure 40.

The enclosure further includes an outer side wall 68 in the form of a rectangular panel which is vertically oriented to project forwardly from one side edge of the rear wall 50 in alignment with a corresponding side edge of the top wall 66 so as to be perpendicular to both the top wall and the rear wall. An intermediate side wall 70 is also joined to the rear wall along the full height thereof and to the top wall to project forwardly from the rear side to the front side of the enclosure in parallel and spaced apart arrangement from the outer side wall 68 at an intermediate location spaced laterally inward from both side edges of the rear panel and the top wall.

An intermediate panel 72 is joined horizontally between the outer side wall and the intermediate side wall at an intermediate height between the top and bottom ends of the enclosure so as to be parallel and spaced below the top wall 66. In this manner, a fuel pump compartment 74 is defined which is bound at the rear by the rear wall portion 50, is bound at opposing sides by the outer side wall 68 and the intermediate side wall 70, and is bound at top and bottom ends by the top wall 66 and the intermediate panel 72 respectively.

The enclosure further includes a bottom panel 76 defining a floor of the enclosure which spans horizontally between the outer side wall 68 and the intermediate side wall 70 at a location which is parallel and spaced below the intermediate panel 72. In this manner a battery compartment 78 is defined which is bound by the rear wall 50, the outer side wall 68, the intermediate side wall 70, the intermediate panel 72 and the bottom panel 76 while remaining open at the front side similarly to the fuel pump compartment 74.

The rigid supply pipe and pipe aperture through which it is received are aligned with the fuel pump compartment for connection to the fuel pump which is in turn fully received within the fuel pump compartment. The outlet of the fuel pump in turn communicates through an outlet aperture in the intermediate side wall in proximity to the top end thereof for communicating with an adjacent dispenser compartment described in further detail below.

The battery compartment 78 is suitably sized to receive two conventional automotive 12 volt batteries therein. A solar charge controller 80 is also mounted in the battery compartment for receiving electrical energy from a solar panel 83 as described in further detail below. The solar panel charges the batteries through the solar charge controller 80 which in turn allows a steady electrical charge to be communicated to the fuel pump through the activation switch 28 as further described below.

The enclosure further includes a first door member 82 comprising a generally rectangular rigid panel which is hinged to the outer side wall 68 at the front side thereof such that the first door member is pivotal about a vertical hinge axis. The first door member is pivotal between a closed position in which the first door member fully spans and encloses the front side of the fuel pump compartment and the open front side of the batter compartment therebelow, and an open position in which the pump compartment and the battery compartment are substantially unobstructed by the first door member at the front side thereof such that the front sides remain open.

A suitable latch 84 is mounted in the first door member 82 adjacent one side edge thereof opposite the hinges for being selectively latched to a corresponding latching element on the intermediate side wall 70 adjacent the forward end thereof. The latch 84 incorporates a locking element 86 therein to restrict the latch from being released when the locking element is in a locking position, thereby restricting the first door member 82 from being pivoted from the closed position to the open position by unauthorized persons. When the first door member 82 is closed, unauthorized persons are also restricted from accessing the locking collars 52 which serve to fixedly retain the enclosure mounted on the fuel tank.

Both the top wall 66 and the rear wall portion 50 protrude laterally beyond the intermediate side wall 70 to define top and rear boundaries of a dispenser compartment 88 which spans the full height of the enclosure along one side of the battery and pump compartments. The dispenser compartment remains open at the bottom end thereof.

The outer side and front side of the dispenser compartment are selectively enclosed by a second door member 90 hinged at the rear side of the enclosure at the outer end of the rear wall portion. More particularly, the second door member comprises a side panel 92 and a front panel 94 which are joined in perpendicular relationship relative to one another such that in the closed position the side panel 92 spans the full height and the full depth from the rear to the front of the enclosure at the opposing side relative to the outer side wall 68, while the front panel 94 spans the full front side of the dispenser compartment 88 corresponding to the full height of the enclosure and the full width between the intermediate side wall 70 and the side panel 92 of the second door member.

The hinges of the second door member are located at the rear edge of the side panel 92 and serve to enable the second door member to be pivoted from the closed position about a vertical axis of a second door member to an open position in which the outer side and front side of the dispenser compartment are open and unobstructed by the second door member due to the front panel 94 and side panel 92 being pivoted together from the closed position to the open position.

The dispenser compartment 88 locates the activation switch 28 therein by supporting the activation switch on the intermediate side wall 70 adjacent the top end thereof.

The dispenser compartment further includes a dispenser hook 96 also supported on the intermediate side wall 70 at an intermediate location. The dispenser nozzle can be hooked and supported on the dispenser hook when not in use. The elongate flexible dispensing hose, which is coupled between the outlet of the fuel pump and the dispenser nozzle has sufficient length that it is suspended to hang through the open bottom end of the dispenser compartment even when the second door member 90 is closed. A hanger hook 98 on the intermediate side wall 70 permits one or more loops of the flexible dispenser hose to be hooked thereon to store the hose more compactly while only partially restricting access to the hose.

The solar panel 83 is supported at the top end of a post 100 which is mounted to extend vertically upward from a central location of the top wall 66 in a working position. The solar panel 83 is pivotal about a vertical axis relative to the post and enclosure therebelow to allow the solar panel to be optimally oriented relative to the sun. The post 100 is coupled to the top wall of the enclosure using a suitable hinge structure to allow the post and solar panel supported thereon to be folded about a horizontal folding axis from a working position to a storage position in which the post is closer to horizontal in orientation such that the solar panel is reduced in height relative to the working position.

The enclosure according to the present invention can be adapted to be supported on a large variety of different tank configurations by allowing the user to cut the vertical section 34 and the horizontal section 38 of the rigid supply pipe to length. Accordingly, the enclosure can be positioned at one upright end wall of a tank structure such that the lower portion of the rear wall 50 abuts the end wall while the shoulder formed by the shroud protruding from the rear wall engages upon the top side of the fuel tank to support part of the weight of the enclosure on the fuel tank. The length of the sections of the rigid supply pipe are then cut to length to span the distance from the rear pipe aperture in the rear wall 50 of the enclosure to the outlet fitting in the top wall of the tank. The rigid pipe connections serve to maintain the enclosure securely engaged at the end wall and top wall of the fuel tank in the mounted position as illustrated.

Figure 8:
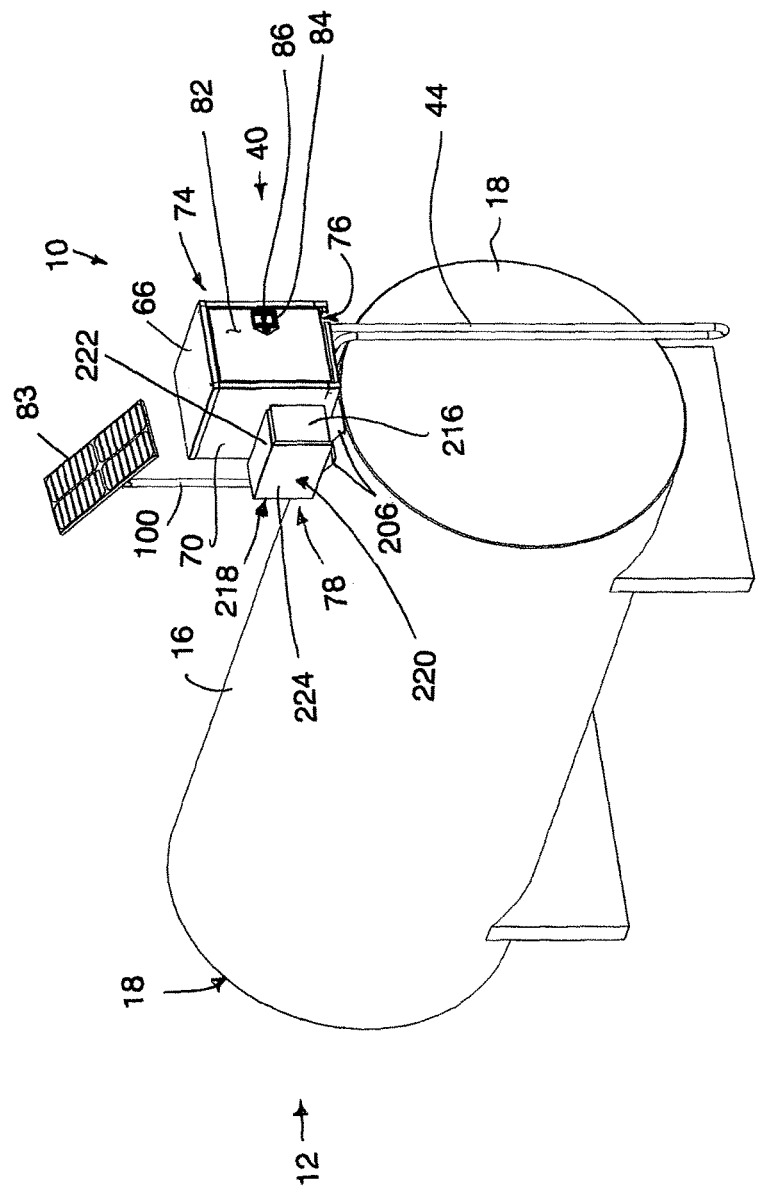
FIG. 8 is a perspective view of the remote fueling station shown supported on a fuel storage tank according to a second embodiment.
Figure 9:
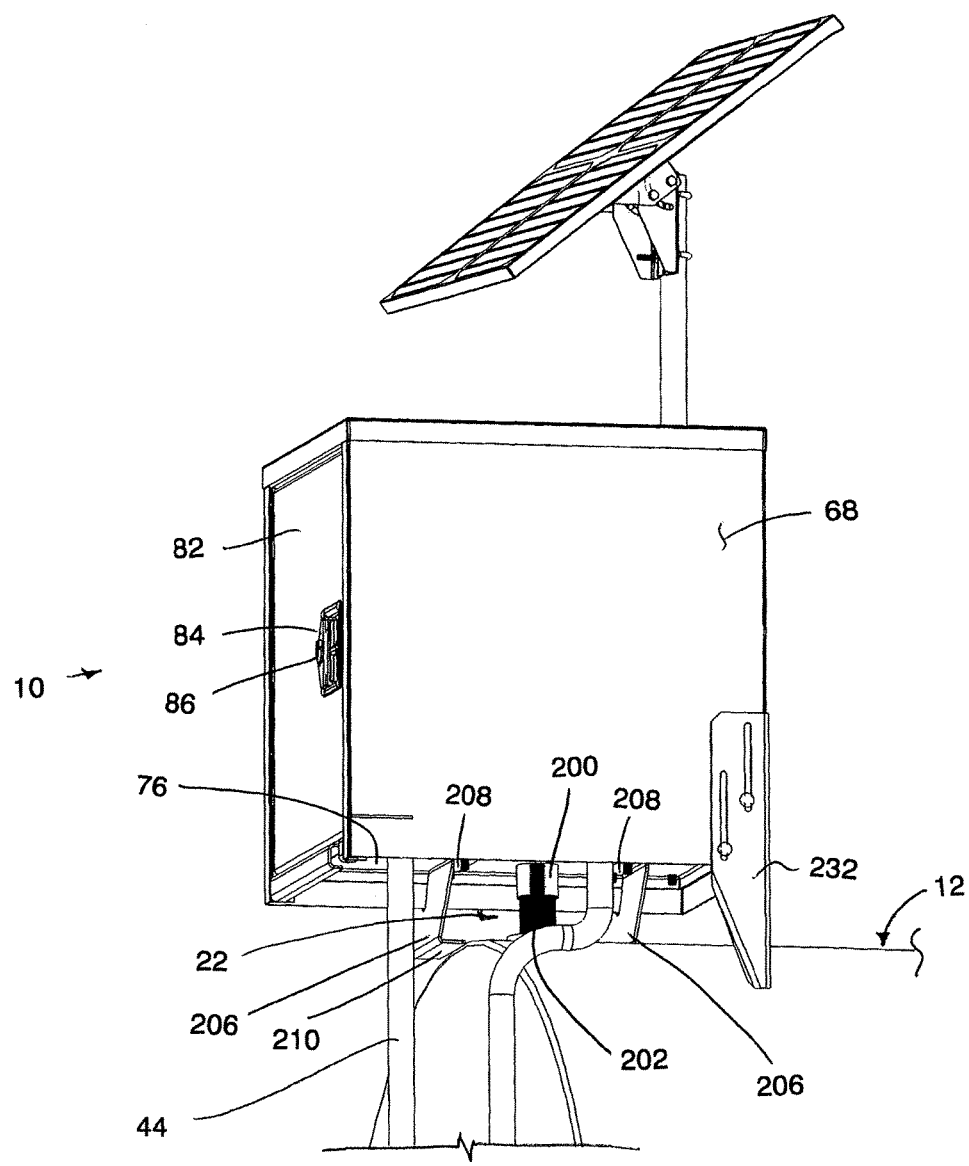
FIG. 9 is a perspective view of a bottom side of the enclosure according to the second embodiment of FIG. 8.
Figure 10:
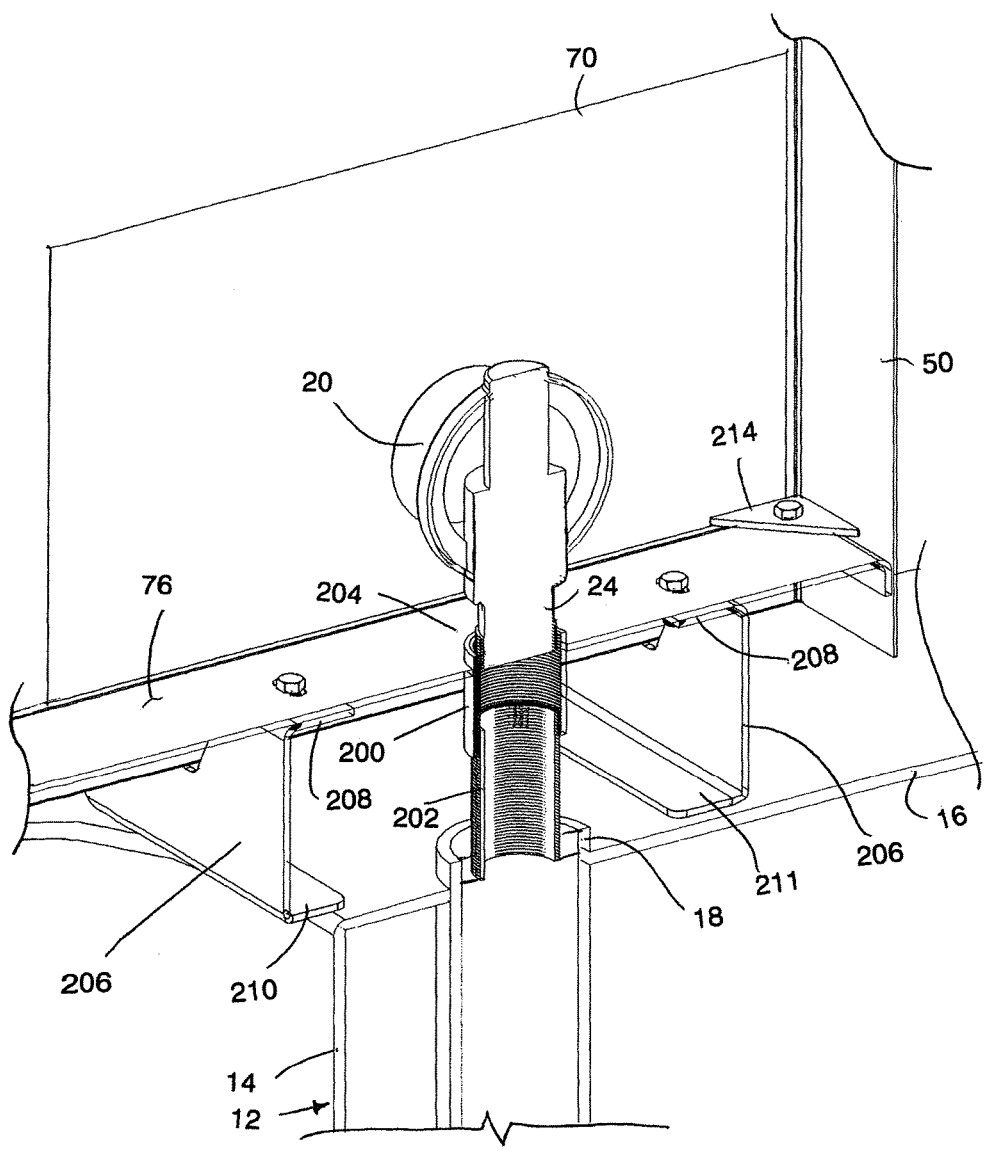
FIG. 10 is a vertical sectional view through the outlet fitting of the tank according to the second embodiment of FIG. 8.
Figure 11:
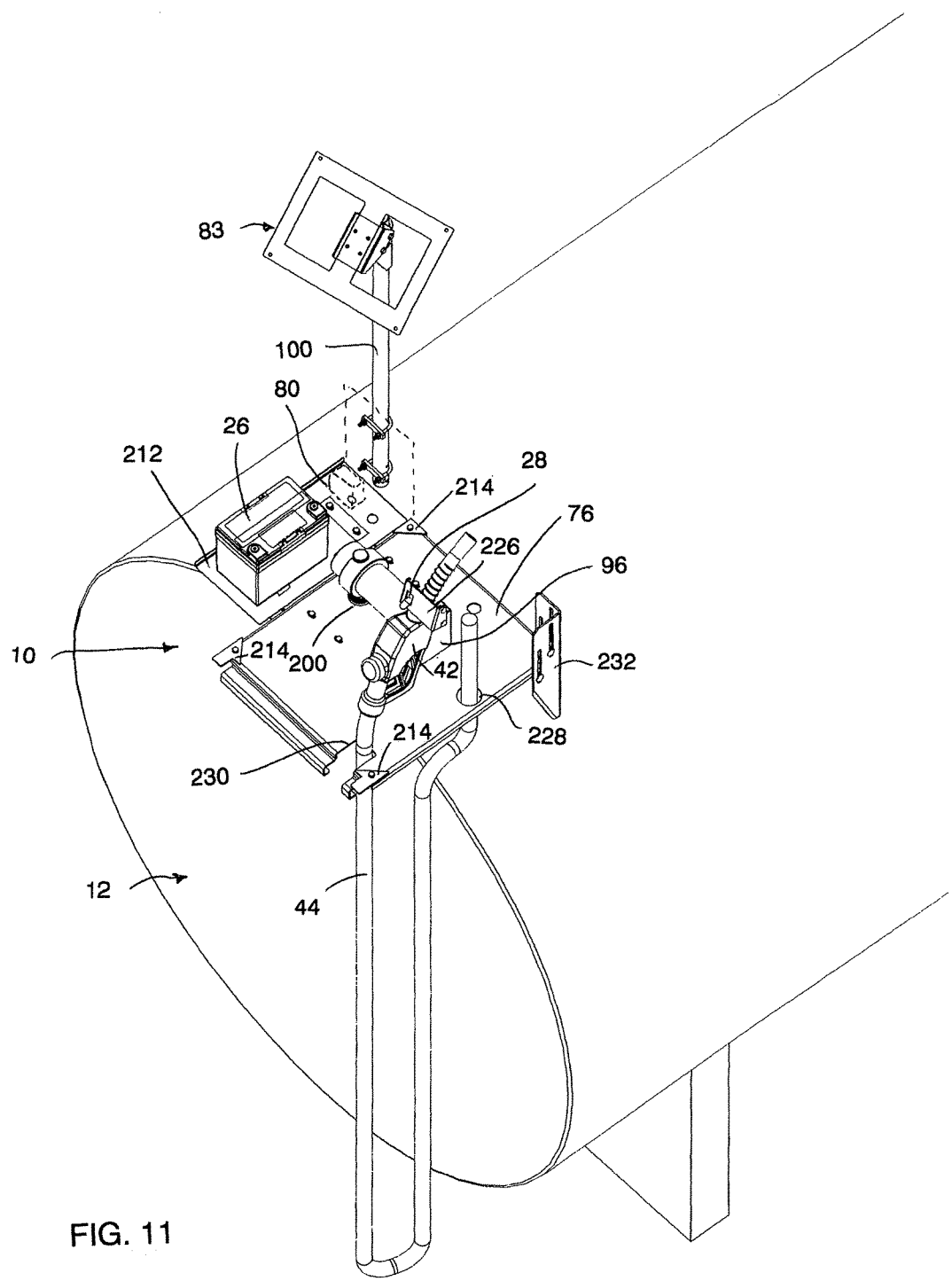
FIG. 11 is a perspective view of the enclosure according to the second embodiment of FIG. 8, shown with some of the walls removed.
Figure 12:
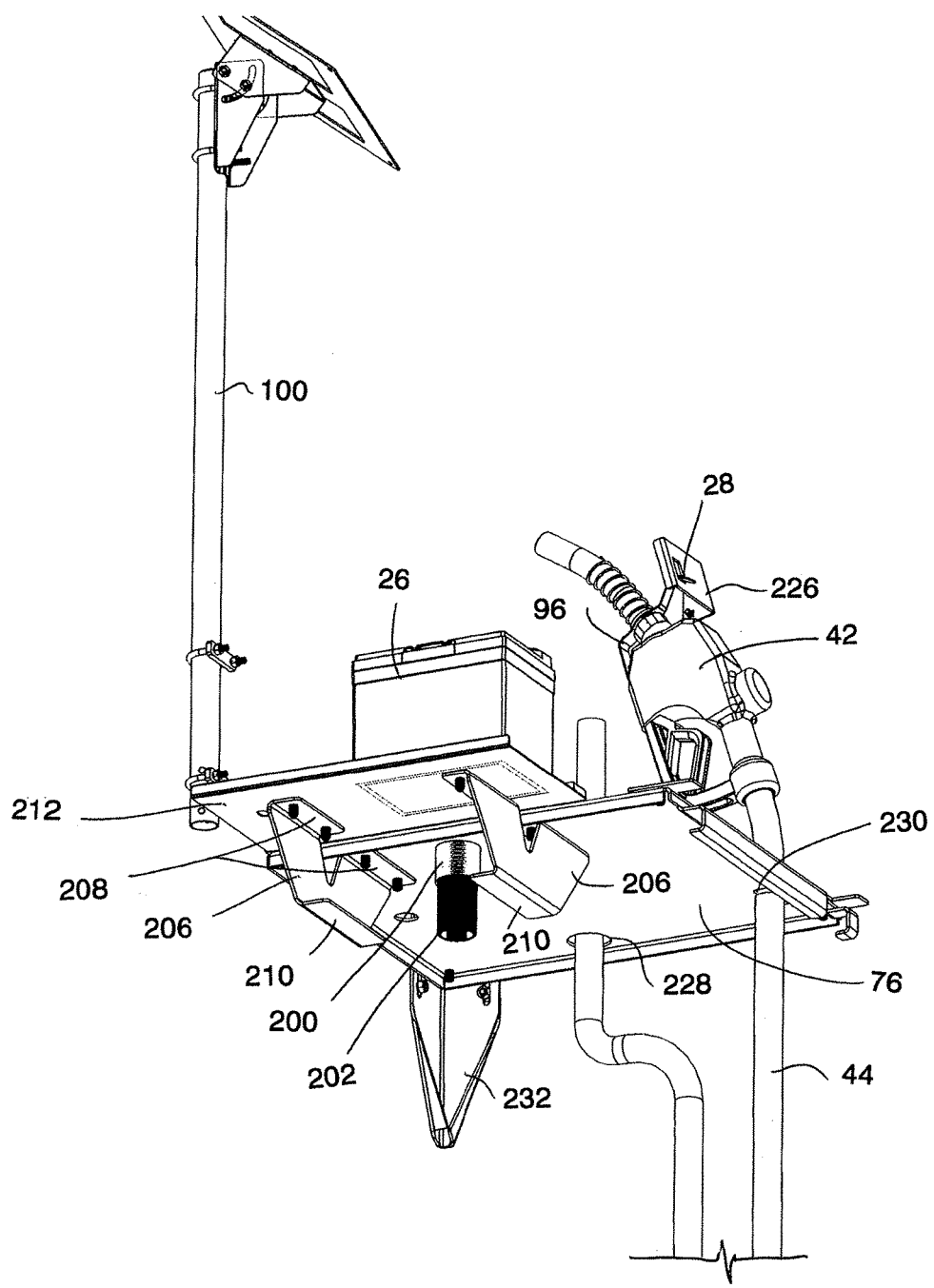
FIG. 12 is a perspective view of the lower portion of the enclosure according to the second embodiment of FIG. 8, shown separated from the tank and with some of the walls of the enclosure removed.

Turning now to the second embodiment of FIGS. 8 through 12, the enclosure 40 in this instance is supported fully above the storage tank 12 as described in further detail in the following.

The enclosure 40 in this instance again includes a bottom panel 76 which defines a bottom side boundary of the enclosure. The bottom panel is in the form of a rectangular rigid plate having an opening therein which is suitably sized for receiving the rigid supply pipe 22 extending vertically upwardly through the bottom panel. Both side edges, a rear edge, and a front edge of the plate are folded over to define a stiffening flange depending downwardly from the main portion of the plate for providing strength to the enclosure.

A threaded collar 200 is mounted concentrically within the opening in the bottom panel 76 and is welded in fixed relationship to the surrounding plate. The outlet fitting 18 of the tank is connected to an externally threaded section 202 of the rigid supply pipe 22 for making a threaded mating connection with the internal threads within the collar 200 for coupling the collar and the bottom panel 76 fixed thereto relative to the outlet fitting of the tank. An internal section 204 of the rigid supply pipe 22 forms a threaded connection to the inner side of the threaded collar 204 connection between the threaded collar 200 and the fuel pump 20 received within the enclosure.

The bottom panel 76 is supported at a location spaced above the top side of the tank 12 directly above the outlet fitting in the top side of the tank. Two support legs 206 are joined perpendicularly to the bottom side of the bottom panel 76 so as to be parallel and spaced apart from one another at diametrically opposing sides of the outlet pipe. Each support leg 206 comprises an upright plate spanning between a respective top flange 208 joined to the bottom panel 76 using threaded fasteners and a bottom flange 210 which forms a footing for engaging the top side of the tank. The plates may provide support to the enclosure relative to the tank in addition to the threaded connection to the outlet fitting while also at least partially restricting access by unauthorized persons to the outlet fitting.

The two upright plates forming the support legs 206 protrude laterally outwardly beyond a corresponding side edge of the plate forming the bottom panel 76 such that an auxiliary panel 212 can be mounted in fastened connection to respective portions of the top flanges 208 of the support legs. The auxiliary panel 212 is coplanar with the bottom panel 76, directly adjacent to one side edge thereof.

The enclosure 40 according to the second embodiment includes a primary compartment above the bottom panel 76 which forms the fuel pump compartment 74 receiving the fuel pump therein that communicates with the rigid supply pipe communicating through the bottom panel 76. The enclosure 40 also includes a secondary compartment above the auxiliary panel 212 which defines the battery compartment 78 for receiving the battery 26 therein.

The primary fuel pump compartment 74 includes a rear wall portion 50 extending vertically upward from the rear edge of the bottom panel, an intermediate sidewall 70 extending upward from the side edge of the bottom panel adjacent to the auxiliary panel 212, an outer side wall 68 extending upward from the other side edge of the bottom panel opposite the auxiliary panel 212, and a top panel 66 similarly sized to the bottom panel 76 for spanning between the top edges of the two side walls and the rear wall portion 50. The two side walls, the rear wall, and the top wall are all joined together as an integral structure which can be selectively secured to the bottom panel 76 using threaded fasteners.

A pair of generally triangular gusset plate 214 are mounted in fixed relation to each of the side walls 68, 70 at the bottom side thereof, at the front and rear corners respectively. The gusset plates 214 are joined in fixed connection to the side walls in perpendicular relation thereto such that the four corner gusset plates 214 are generally coplanar with one another. In a mated position of the walls of the enclosure onto the bottom panel, the four corner gusset plates overlap flat against the upper surface of the bottom plate 76 at the four corners thereof respectively. Suitable fasteners which are connected through corresponding apertures in the gusset plates 214 and corresponding apertures in the bottom panel 76 permit four corner fasteners to selectively secure the walls of the primary enclosure relative to the bottom panel. The fasteners are secured from the interior of the compartment only to prevent access to unauthorized persons when the first compartment is locked in a closed position.

A first door 82 is suitably sized for fully spanning and selectively enclosing the remaining open front side of the primary compartment of the enclosure by spanning the full width between the intermediate sidewall and the outer side wall, and spanning the full height between the top panel and the bottom panel. The first door 82 is hinged at the front edge of the intermediate sidewall for pivotal movement about a vertical axis of the door between open and closed positions of the door. A suitable latch 84 with a lock 86 incorporated therein is again provided on the first door for restricting access to the interior of the fuel pump compartment when the door is locked.

The battery compartment in this instance is enclosed by a front wall 216 extending vertically upward from a front edge of the auxiliary panel 212 and a rear wall 218 extending vertically upward from the rear edge of the auxiliary panel 212. The front and rear walls are mounted so as to be fixed relative to the auxiliary panel 212, for example by hidden fasteners or welding and the like. A second door 220 is provided in the form of a top panel 222 and a side panel 224 joined in perpendicular relationship to one another for selectively enclosing the top side and the outer side of the secondary compartment. The side panel 224 is thus position to extend vertically upward from the outer side edge of the auxiliary panel 212 opposite from the primary compartment in the closed position of the second door 220. The top panel 222 spans horizontally between top edges of the front and rear walls, and between the top edge of the side panel 224 and the intermediate side wall 70 of the primary compartment when the second door 220 is closed. The second door 220 remains readily removable from the remainder of the enclosure for access to the battery within the secondary compartment as may be required for maintenance and the like.

A suitable solar charge controller 80 is also mounted within the secondary battery compartment for regulating the charging of the battery from the solar panel 83. The solar panel 83 in this instance is supported at the top end of the post 100 using an angularly adjustable bracket. The bottom end of the post 100 is anchored externally on the rear wall 218 of the secondary compartment of the enclosure so as not to interfere with opening and closing of the second door 220. Suitable access holes are provided in the auxiliary panel 212 and the bottom panel 76 to communicate wiring from the solar panel 83 to the solar charge controller 80 and battery, and from the battery to the fuel pump in the adjacent compartment.

Within the fuel pump compartment 74, a support bracket 226 is fastened to the interior side of the outer side wall 68. The bracket supports the activation switch 28 which is a toggle switch mounted in series between the power supply from the battery to the fuel pump so that the activation switch is operable between on and off states which supplies or interrupts power to the fuel pump respectively. The support bracket 226 also supports the dispenser hook 96 thereon which allows the nozzle portion 42 to be selectively suspended from the bracket when not in use. The hose portion 44 of the dispenser nozzle includes a first end connected to the outlet of the fuel pump in close proximity to an access hole 228 in the bottom panel 76 which receives the hose portion 44 therethrough in proximity to the first end of the hose portion. The majority of the hose portion 44 is thus suspended externally of the enclosure.

A storage slot 230 is formed in the bottom panel so as to be suitably sized to receive a second portion of the hose portion 44 therethrough, at a location nearer to the nozzle portion 42. The storage slot is open to the front edge of the bottom panel 76 so that when the first door 82 is open, the second portion of the hose portion 44 proximate to the nozzle portion 42 can be received through the slot with the nozzle portion 42 supported on the dispenser hook 96, and the first door can be closed to restrict access to the nozzle portion 42 and the activation switch 28. Unlocking and opening the first door 82 provides ready access for an authorized user to unhook the nozzle portion 42 from the dispenser hook 96 to withdraw the nozzle portion from the enclosure, which in turn withdraws the hose portion 44 from the storage slot 230 in the bottom panel.

The enclosure according to the second embodiment of FIGS. 8 through 12 is mounted onto the tank 12 by first attaching the auxiliary panel 212 and the bottom panel 76 to the two support legs 206. The bottom panel 76 is then attached to the outlet fitting of the tank by forming a threaded connection between the threaded section 202 of the rigid supply pipe from the outlet fitting to the threaded collar 200. The bottom panel can be rotated with the threaded collar about a vertical axis of the rigid supply pipe extending vertically from the outlet fitting of the tank until the bottom ends of the support legs engage the top side of the tank.

The battery in the fuel pump can then be mounted within their respective compartments together with the attachment of the solar panel to the rear wall of the auxiliary panel 212. The surrounding walls and the doors of the battery and fuel pump compartments are then mounted onto the bottom panel and auxiliary panel respectively. In the instance of the primary fuel pump compartment, the enclosure of walls with the front door 82 are joined to the corners of the bottom panel 74 using fasteners secured from the interior side of the enclosure at the four corner gusset plates 214. Locking the first door 82 subsequent to assembly will restrict access to the fasteners at the four corner gusset plates 214 respectively.

To prevent unauthorized users from rotating the enclosure relative to the threaded connection between the collar 200 and the outlet fitting 18, the enclosure is further provided with a depending leg 232 which is mounted to the outer side wall and rear wall of the primary compartment so as to be adjustable in height relative to the remainder of the enclosure to vary the length that the depending leg protrudes downwardly beyond the bottom panel 74. More particularly the depending leg 232 comprises two plates mounted perpendicularly to one another with fastener slots therein for receiving fasteners which permit fastening of the plates to the outer side wall 68 and the rear wall portion 50 respectively. The depending leg is suitably arranged to be mounted such that the bottom end of the leg is spaced below the bottom panel 74 by a greater distance than the height of the support legs 206. The depending leg is secured by fasteners which are accessed from the interior of the enclosure such that the fasteners in mounted position of the depending leg cannot be accessed or adjusted by unauthorized persons when the primary fuel compartment is closed and locked.

In the instance of a cylindrical tank, when the two support legs 206 span between the bottom panel and the uppermost portion of the cylindrical side wall of the tank, the depending leg 232 is positioned to engage the tank at a portion of the cylindrical side wall which is lower in elevation than the central uppermost region of the cylindrical side wall engaged by the support legs and locating the outlet fitting therein. The depending leg thus forms a non-rotatable, mating connection between the enclosure and the tank which prevents rotation of the enclosure about a vertical axis of the outlet fitting of the tank. This prevents unauthorized users from releasing the threaded connection between the collar 200 of the enclosure and the outlet fitting of the tank.

The remote fueling station 10 according to the second embodiment is operated substantially identically to the first embodiment. In order to dispense fuel from the station, an authorized user unlocks the first door, pivots the first door into an open position in which the front side of the primary compartment is substantially unobstructed to allow the nozzle portion 42 of the dispenser nozzle to be withdrawn from the fuel pump compartment. The user then activates the switch 28 into the on position which activates the pump to pressurize the outlet of the pump. Subsequent release of the trigger on the nozzle portion 42 allows the valve at the nozzle portion to be opened for dispensing a flow of fuel from the tank through the dispenser nozzle. Releasing the trigger will close the valve in the dispenser nozzle and cease dispensing fuel. The user can then replace the nozzle portion on the dispenser hook 96 within the fuel compartment and the activation switch is turned off. The hose portion is received within the slot 230 when the nozzle portion is mounted on the dispenser hook 96 so that the first door can be closed with the nozzle portion locked within the fuel pump compartment. By turning off the activation switch, the fuel pump cannot be activated by unauthorized persons even if access is provided to the battery compartment.

Since various modifications can be made in my invention as herein above described, it is intended that all matter contained in the accompanying specification shall be interpreted as illustrative only and not in a limiting sense.

The invention claimed is:

1. A remote fueling station in combination with a fuel storage tank supported above ground and having an outlet fitting, the remote fueling station comprising:
   a fuel pump having an inlet arranged to receive fuel from the fuel storage tank and an outlet arranged to dispense a pressurize flow of fuel therefrom;
   a supply pipe assembly in connection from the outlet fitting of the fuel storage tank to the inlet of the fuel pump;
   a dispenser nozzle in connection with the outlet of the fuel pump for dispensing the pressurize flow of fuel therefrom; and
   an enclosure comprising a plurality of boundary panels supported about and surrounding the fuel pump so as to be arranged to restrict activation of the fuel pump by unauthorized persons;
   the enclosure being supported on the fuel storage tank in fixed relation thereto so as to restrict removal of the enclosure from the fuel storage tank by unauthorized persons;
   the supply pipe assembly comprising:
      a rigid pipe in connection to the outlet fitting of the fuel storage tank;
      a threaded pipe fitting in threaded connection to the rigid pipe at an intermediate location along the supply pipe assembly between the fuel pump and the outlet fitting of the fuel storage tank;
      the threaded pipe fitting being mounted in fixed relationship on one of the boundary panels of the enclosure such that the supply pipe assembly extends through said one of the boundary panels; and
      the fuel pump inlet being in connection with the threaded pipe fitting at an interior of the enclosure.

2. The remote fueling station according to claim 1 wherein the plurality of boundary panels of the enclosure includes a bottom panel at a bottom side of the enclosure which receives the threaded pipe fitting mounted thereon such that the supply pipe assembly extends through the bottom panel.

3. The remote fueling station according to claim 1 wherein the enclosure mates non-rotatably with the fuel storage tank and wherein the enclosure comprises:
   a bottom panel defining a bottom side of a fuel pump compartment receiving the fuel pump therein;
   a plurality of support legs extending downwardly from the bottom panel to engage a top side of the fuel storage tank; and
   a depending leg portion which protrudes downwardly from the bottom panel to a bottom free end which is positioned lower than a bottom end of the support legs to prevent relative rotation between the enclosure and the fuel storage tank about the supply pipe assembly.

4. The remote fueling station according to claim 3 wherein the depending leg portion is adjustable in height relative to the enclosure.

5. The remote fueling station according to claim 1 wherein the enclosure comprises a fuel pump compartment receiving the fuel pump therein and a battery compartment connected to and separate from the fuel pump compartment which receives therein a battery for supplying power to the fuel pump such that the battery is isolated from the fuel pump and wherein the fuel pump compartment of the enclosure further receives the dispenser nozzle therein so as to be arranged to restrict access to the dispenser nozzle by unauthorized persons.

6. A remote fueling station for a fuel storage tank supported above ground and having an outlet fitting, the remote fueling station comprising:

a fuel pump having an inlet arranged to receive fuel and an outlet arranged to dispense a pressurize flow of fuel therefrom;

a supply pipe arranged to connect from the outlet fitting of the fuel storage tank to the inlet of the fuel pump in fixed relation therebetween;

a dispenser nozzle arranged to connect to the outlet of the fuel pump for dispensing the pressurize flow of fuel therefrom; and an enclosure arranged to be supported about the fuel pump so as to be arranged to restrict activation of the fuel pump by unauthorized persons;

the enclosure being arranged to be supported on the fuel storage tank in fixed relation thereto so as to restrict removal of the enclosure from the fuel storage tank by unauthorized persons;

the enclosure comprising:

a bottom panel defining a bottom side of a fuel pump compartment receiving the fuel pump therein;

a pair of support legs extending downwardly from the bottom panel so as to be arranged to engage a top side of the fuel storage tank; and a depending leg portion which protrudes downwardly from the bottom panel to a bottom free end which is positioned lower than a bottom end of the support legs so as to be arranged to prevent relative rotation between the enclosure and the fuel storage tank about the supply pipe.

7. The remote fueling station according to claim 5 wherein the depending leg portion is adjustable in height relative to the enclosure.

* * * * *